Jan. 19, 1937.  R. W. ATKINSON  2,068,624
HIGH VOLTAGE BUSHING
Filed March 12, 1928   2 Sheets-Sheet 1
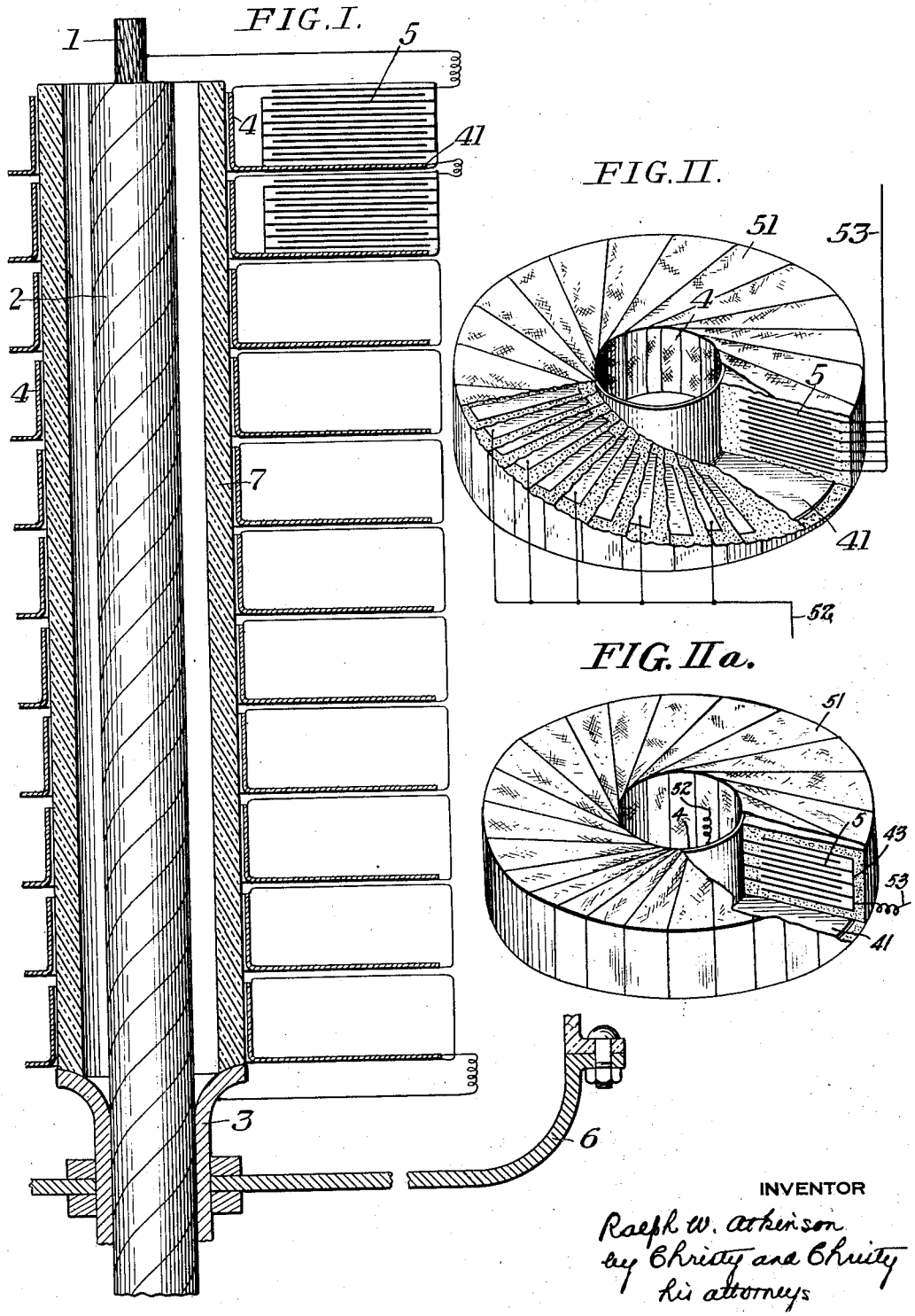
INVENTOR
Ralph W. Atkinson
by Christy and Christy
his attorneys Jan. 19, 1937.  R. W. ATKINSON  2,068,624
HIGH VOLTAGE BUSHING
Filed March 12, 1928  2 Sheets—Sheet 2
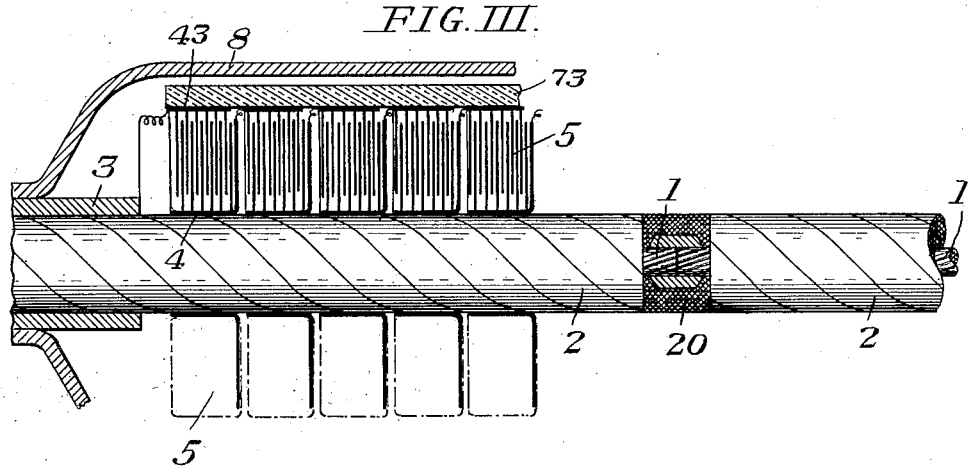
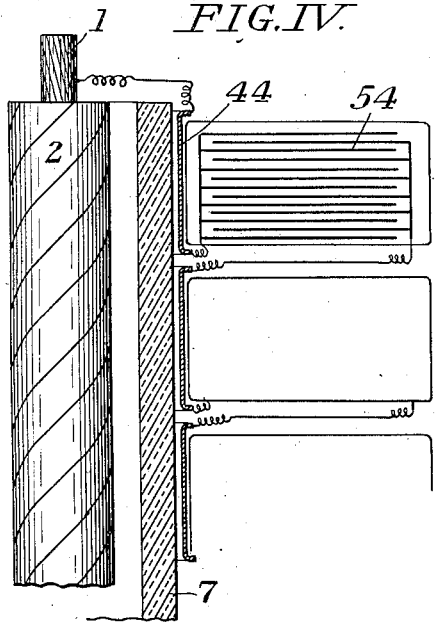 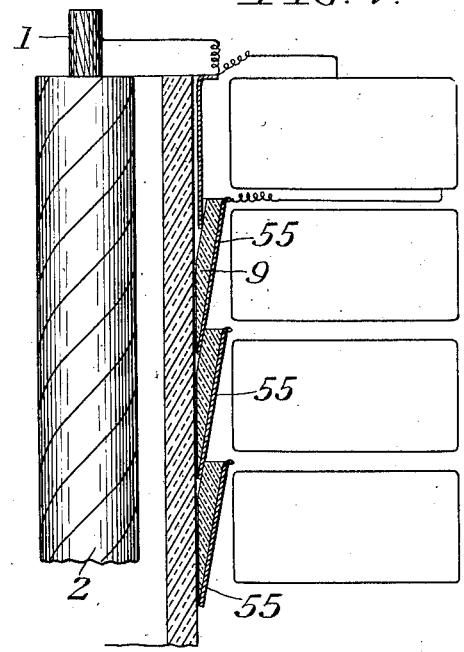
INVENTOR
Ralph W. Atkinson
by Christy and Christy
his attorneys Patented Jan. 19, 1937

2,068,624

UNITED STATES PATENT OFFICE 2,068,624

HIGH VOLTAGE BUSHING

Ralph W. Atkinson, Perth Amboy, N. J., assignor to General Cable Corporation, New York, N. Y., a corporation of New Jersey Application March 12, 1928, Serial No. 261,091

14 Claims. (Cl. 173—268)

My invention relates to electrical installations, and particularly to improvements in high-voltage insulations and in one specific application may be found in improvements upon the structure set forth and described in my application for Letters Patent of the United States, Serial No. 119,898, filed July 1st, 1926, now Patent No. 1,868,962, July 26, 1932. The object of the present improvement is to carry forward the invention in specific features which I have found to be most excellent for service.

The present invention is illustrated in the accompanying drawings. Fig. I is a fragmentary and somewhat diagrammatic view, showing partly in axial section a structure embodying my present invention. Fig. II is a view in perspective and to larger scale of a single unit of the plurality shown in Fig. I, dissected to illustrate details of structure. Fig. IIa is a similar view of a single unit having a slightly different construction. Fig. III is a view corresponding to Fig. I and showing the invention in another specific application. Figs. IV and V are views corresponding to Fig. I and illustrating permissible modifications.

It is fundamental to the practice of the invention that there be a conductor protected by a wall of insulation and that there be, external to such wall, a second body of conducting material, and that between the two conducting bodies there be a difference of potential and, consequently, stress upon the wall of insulation. Such a state of things may exist in the terminal of a cable, it may exist in the joint of a cable, it may exist in a transformer bushing, it may exist in a transformer between windings or between a winding and the iron core. The wall of insulation may be a sleeve of such insulating material as porcelain or a synthetic resin of phenolic type, or it may be a wall built up of wrapped paper or other fibrous material, filled with insulating compound. The stress may be considered as made up of radial and longitudinal components. Paths of the longitudinal component lie both in the air (or in oil, if the parts happen to be submerged in a bath of oil) and over the surface of the wall of insulation and internally, within the wall. And if the insulation be laminate the strain along the internal pathway may be especially dangerous.

If two electrically conducting bodies are separated by a distance small compared with the surface dimensions of these bodies, the electrical field in the region between the bodies is substantially uniform and perpendicular to the surfaces of the bodies. Thus, in the region between these bodies, an electrical insulation may be used satisfactorily which has a high dielectric strength in the direction in which the stress is high but which may have a much lower dielectric strength in the other direction. The difficulty, however, comes in at the boundaries of the conducting bodies or at the boundary of one of them if it is much less extensive in area than the other. At this point, the stress is no longer uniform and normal to the adjacent surfaces of the conducting bodies, but there is a large component of the stress in a direction parallel to these surfaces. The result of this component parallel to the surfaces of these bodies is two-fold. It tends to produce a discharge over the surface of the insulation even though the distance of separation over the surface be very great as compared with the thickness of the wall of insulation. It also tends to produce failure in the electrical insulation itself in case this is not homogeneous in its strength for stresses in different directions.

Referring to Fig. I of the drawings, a conductor 1 is shown to be enveloped in a wall 2 of insulation and external to the wall is a conducting body 3. In this instance the particular structure shown is a cable and extending within a terminal casing whose wall is indicated at 6. In such a structure when in service a strain is set up between the exposed conductor 1, and the cutaway end 3 of the cable sheath, and this strain is longitudinal, and is exerted externally over the surface of the wall 2 of insulation and internally within the substance of the wall as well. Under high-tension conditions this strain either externally or internally or both externally and internally may become dangerously great. This strain, but for the device in which invention centers, varies in intensity throughout the length of the pathway of threatened breakdown and the object in view is a distribution of the stress, so that it will be more nearly uniform throughout the extent of the pathway. By such distribution manifestly the structure as a whole may be strengthened.

The invention involves the surrounding of the wall of insulation with a succession of zones of conducting material, zone following zone, one after another, longitudinally of the conductor, and providing impedances other than and in addition to the zones themselves, electrically connected between successive pairs of zones, and in so adjusting the relative value of successive impedances as to effect the desired distribution. In Fig. I the zones are indicated by the numeral 4, and the impedances, in this instance condensers, by the numeral 5. The matter of the relative value of successive condensers, and adaptation here to conditions of strain, are matters which will be understood by the engineer. In the particular structure under consideration, the zones 4 are applied upon a bushing 7 of insulation which in turn surrounds the wall 2 and which is interposed between the end of the sheath 3 and the exposed conductor end 1. The bushing 7 will be recognized to be another wall of insulation, additional to the wall 2, interposed between the conductor 1 and the cable sheath 3. Under such circumstances one path of threatened breakdown is external and extends longitudinally on the surface of the bushing 7. There is longitudinal strain also within the substance of which bushing 7 is composed, and in the annular space as well between bushing 7 and the insulated conductor, a space which may be understood to be filled with oil. There is longitudinal strain also within the wrapped-on body 2 of insulation which surrounds the conductor 1. Failure may occur due to longitudinal strain in any of these places, depending upon the magnitude of the voltage impressed, the character of the insulation with regard to longitudinal strength, and the voltage and time of its application. It is not difficult to provide insulation which shall be strong against radial breakdown; the dangers to be particularly guarded against are that of breakdown externally, over the surface of the bushing 7, or longitudinally within the wrapped-on body of insulation or between that and the bushing 7 or even longitudinally within the bushing 7.

The zones 4 in their aggregate extent cover more than half of the surface of the wall 7 of insulation. By so spreading the zones radial strains may be spread and diminished, while it is quite possible sufficiently to insulate zone from zone, against the danger of step by step breakdown between zones. It will be recognized that where the aggregate extent of the zones covers more than half of the surface of the insulation, the zones form a substantially continuous electrostatic shield around the insulation.

A feature of my invention is to form my protective device of a series of units such as may be built up as units in the factory under quantity production methods and then be assembled in place in an assembly room in the factory, or even in the field and connected, to make a serviceable installation.

Turning to Fig. II, an annulus 4, which in the assembly constitutes a zone, is extended at one end in an outstanding flange 41. In the angle formed by and between annulus and flange a condenser structure 5 is built up. The ring-formed structure may manifestly be encased in insulation in any preferred manner. I find it convenient to encase the whole in solid insulation by wrapping the ring with insulating tape 51. Through the casing, leads 52 and 53 issue from the alternate sets of condenser plates, and by these leads the successive condensers when assembled may be connected in series. The zone 4 with its flange 41 may or may not form a constituent part of the condenser.

Manifestly the condenser 5 may be enlarged indefinitely in a direction radial with respect to the conductor 1, and there is practically no limit to the condenser effect thus obtainable.

As I have said a succession of units such as that shown in Fig. II, each of desired physical and electrical magnitude, preformed in the factory, may in the field be strung upon the bushing 7, connected in series in the manner indicated, and so organized into a protective device, serving in the manner and for the ends described.

In the particular installation shown in Fig. I a bushing 7 is provided, surrounding the cable envelope 2. Such a bushing is not indispensable, and the units, with proper adaptation in size, might be strung directly upon the envelope 2. Such an arrangement is shown in Fig. III. Here the conductors 1 of two cable ends are united. The space around the union and between the cut-away ends of the envelopes 2 of insulation is filled with a body of insulation 20 and upon the continuous surface so formed the units 5 are arranged. The zones 4 closely overlie the body 2 of insulation. The zones at the ends of the succession are electrically united to the cut away ends 3 of the cable sheath, and the zone 4 of the unit which immediately overlies the union may be connected electrically to the joined conductor ends 1. The assembly of units 5 upon the joined and insulated cable conductor is encircled by a sleeve 73 of insulation and similarly as the units 5 include zones 4 which extend in succession externally upon the body 2 of insulation, the units 5 include zones 43 also which extend in succession internally upon the sleeve 73. A junction box casing 8 encloses the whole. It will be manifest from what has gone before that by such means the strain existing between the united ends 1 of the cable length and the cut-away ends of the cable sheath may be distributed, equalized longitudinally, with the result that the structure as a whole is strengthened against breakdown.

Fig. IV shows that the zones 44 lacking flanges such as 41 (Fig. II) may carry the impedances 54, and need not themselves constitute essential parts of the impedances.

Fig. V shows that the zones 55 may be made actually to overlap at their ends, suitable insulation 9 being interposed between. These and other such variations are permissible, without departing from the field of my invention.

The drawings show a conductor of high potential surrounded by conductors of low potential. Manifestly this situation might be reversed. The essential condition to be dealt with is one of difference of potential.

I claim as my invention:

1. A unit adapted to be applied with another like unit in longitudinal succession externally upon and surrounding an insulated conductor and to constitute with such other like unit protection against breakdown along the surface of the conductor insulation, such unit including a tube of conducting material, a second tube of conducting material of greater diameter than the first tube, said tubes being co-axially arranged, a condenser mounted between said tubes, the terminals of said condenser being connected to said tubes.

2. A unit adapted to be applied with another like unit in longitudinal succession externally upon and surrounding an insulated conductor and to constitute with such other like unit protection against breakdown along the surface of the conductor insulation, such unit including a tube of conducting material, a second tube of conducting material of greater diameter than the first tube, said tubes being co-axially arranged, two condenser elements other than and additional to the tubes, said condenser elements being mounted between said tubes, and an envelope of solid insulation enclosing the whole, and leads from the two condenser elements penetrating the envelope of insulation.

3. A unit adapted to be applied with another similar unit in longitudinal succession externally upon and surrounding an insulated conductor and to constitute with such other similar unit protection against breakdown along the surface of the conductor insulation, such unit comprising a cylindrical conducting member having an outer flange, a condenser structure borne by said flange and comprising alternate layers of conducting and insulating material, means electrically connecting the conducting layers forming one plate of the condenser to the cylindrical conducting member, means electrically connecting the conducting layers forming the other plate of the condenser, an envelope of insulating material enclosing the flanged member and the condenser borne thereby, and electrical leads from the two condenser plates extending through the envelope of insulating material.

4. In condenser construction, in combination, a container, a plurality of condenser sections within said container arranged substantially face to face therein, and comprising sections of relatively high potential and sections of relatively low potential, said sections of relatively high potential being remote from a wall of said container, and a lead connected to the section of highest potential and passing outwardly through a passage formed through sections of lower potential and through said wall.

5. In condenser construction, in combination, a container, a plurality of sets of condenser sections therein, each of said sets comprising a stack of condenser sections serially connected in order from one end to the other and arranged with its high tension end adjacent a middle portion of said container, and a common high tension lead for said stacks passing outwardly from the middle portion of said container through a passage formed through one of said stacks.

6. In condenser construction, in combination, a tank of substantially cylindrical cross-section, a condenser therein comprising condenser sections of relatively high potential and sections of relatively low potential arranged in a stack extending coaxial with and lengthwise of said tank, each of said sections being substantially annular in shape, and connectors for said sections, said connectors being contained within the axial passage formed interiorly of the condenser by said annular sections.

7. In condenser construction, in combination, a tank of substantially cylindrical cross-section, a condenser therein comprising condenser sections of relatively high potential and sections of relatively low potential arranged in a stack extending coaxial with and lengthwise of said tank, each of said sections being apertured substantially centrally thereof to form a passage therethrough, high potential means in an end wall of said tank, and means interconnecting said sections of said condenser and leading to said terminal means, said interconnecting means including a rigid conductor in electrical connection with said terminal means and extending through the passage formed by the apertures in said sections, and section connectors accommodated in said passage.

8. In condenser construction, in combination, a plurality of condenser sections each comprising conducting plates and interposed dielectric and arranged substantially face to face in a stack, said condenser sections being substantially ring-shaped, and connecting means positioned interiorly of said rings serially connecting said sections.

9. In condenser construction, in combination, a substantially cylindrical tank, two stacks of condenser sections therein positioned end to end coaxial with and extending lengthwise of said tank, each of said stacks being of substantially circular cross-section and comprising condenser sections of relatively high potential and sections of relatively low potential, the relatively high potential sections of said two stacks being positioned at the adjacent inner ends thereof, and a common high potential lead for said two stacks passing outwardly through an end wall of said tank by way of a passage extending lengthwise through one of said stacks from high to low potential sections.

10. In condenser construction, in combination, a plurality of stacks of condenser sections, each of said stacks comprising a plurality of condenser sections connected in series, and a common high tension lead for said stacks passing outwardly in an axial direction through one thereof.

11. In condenser construction, in combination, a plurality of condenser sections arranged substantially face to face in a stack and having substantially alined openings therethrough, means serially connecting said sections, and a high tension lead passing axially through the passage formed by said alined openings.

12. In condenser construction, in combination, a plurality of condenser sections arranged in substantial alinement and in end to end contact and having substantially alined openings therethrough, said end to end contact of said sections causing said alined openings to form a substantially continuous and substantially unbroken passage, and means electrically connecting sections of said condenser and including connectors accommodated within the said passage formed by said alined openings.

13. In condenser construction, in combination, a plurality of condenser sections arranged in substantial alinement and in end to end contact and having substantially alined openings therethrough, said end to end contact of said sections causing said alined openings to form a substantially continuous and substantially unbroken passage, and means for making electrical connection to said condenser comprising a conductor extending lengthwise of and within the said passage formed by said alined openings, a terminal in the wall of the opening through a section, and a connector leading from said terminal of said section of said condenser to said conductor, said connector and said terminal being within said passage.

14. In condenser construction, in combination, a plurality of condenser sections arranged in substantial alinement, said sections having substantially centrally positioned openings therein and said openings being in substantial alinement, thereby to form a passage, connecting terminals for said sections, said terminals being exposed through the walls of the openings in said sections and thereby being exposed to said passage, and conductive means in said passage for electrically connecting condenser sections.

RALPH W. ATKINSON.